United States Patent
Muthuswamy et al.

(10) Patent No.: US 10,635,643 B2
(45) Date of Patent: Apr. 28, 2020

(54) TIERING DATA BLOCKS TO CLOUD STORAGE SYSTEMS

(71) Applicant: HEWLETT PACKARD ENTERPRISE DEVELOPMENT LP, Houston, TX (US)

(72) Inventors: Priya Pappanaickenpalayam Muthuswamy, Bangalore (IN); Vitaly Oratovsky, Andover, MA (US); Arul Kumar Sivalingam, Bangalore (IN); Shankar Raman, Bangalore (IN); Manny Ye, Andover, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 250 days.

(21) Appl. No.: 15/409,878

(22) Filed: Jan. 19, 2017

(65) Prior Publication Data

US 2018/0089224 A1    Mar. 29, 2018

(30) Foreign Application Priority Data

Sep. 29, 2016    (IN) .............................. 201641033371

(51) Int. Cl.
  *G06F 15/16*    (2006.01)
  *G06F 16/182*    (2019.01)
  (Continued)

(52) U.S. Cl.
  CPC .......... *G06F 16/182* (2019.01); *G06F 16/128* (2019.01); *G06F 16/13* (2019.01); *H04L 67/06* (2013.01); *H04L 67/1097* (2013.01)

(58) Field of Classification Search
  CPC ...... G06F 16/128; G06F 16/13; G06F 16/182; H04L 67/06; H04L 67/1097
  (Continued)

(56) References Cited

U.S. PATENT DOCUMENTS

| | | |
|---|---|---|
| 6,839,769 B2 | 1/2005 | Needham et al. |
| 8,229,985 B2 | 7/2012 | Turner et al. |

(Continued)

FOREIGN PATENT DOCUMENTS

WO    WO-2016073019    5/2016

OTHER PUBLICATIONS

Abate, L., "What's in a Snapshot?" (Web Page), The Nasuni Cloud Storage Blog, Mar. 31, 2010, 3 pages, available at http://www.nasuni.com/114-whats_in_a_snapshot/.

(Continued)

*Primary Examiner* — Taylor A Elfervig
(74) *Attorney, Agent, or Firm* — Hewlett Packard Enterprise Patent Department (57) ABSTRACT

Examples include, in response to fulfillment of a tiering policy, dividing, by a cloud provider engine of a computing device, data blocks of a filesystem object into data chunks. Some examples comprise generating, by the cloud provider engine, a current manifest file in a local memory and causing the cloud storage system to generate a current pseudo folder in the cloud storage system corresponding to a particular epoch of the filesystem object. Some other examples comprise tiering, by the cloud provider engine, the data chunks and the current manifest file to the current pseudo folder, the current manifest including pointers to the data chunks corresponding to the filesystem object at the particular epoch.

20 Claims, 6 Drawing Sheets

(51) Int. Cl.
*H04L 29/08* (2006.01)
*G06F 16/13* (2019.01)
*G06F 16/11* (2019.01)

(58) Field of Classification Search
USPC .......................................................... 709/217
See application file for complete search history.

(56) References Cited

U.S. PATENT DOCUMENTS

| | | | |
|---|---|---|---|
| 8,396,895 | B2 | 3/2013 | Miloushev et al. |
| 8,504,597 | B2 | 8/2013 | Pitts |
| 8,799,413 | B2 | 8/2014 | Taylor et al. |
| 8,880,474 | B2 | 11/2014 | Mason et al. |
| 9,047,302 | B1 | 6/2015 | Bandopadhyay |
| 2003/0115439 | A1 | 6/2003 | Mahalingam et al. |
| 2005/0114291 | A1 | 5/2005 | Becker-Szendy et al. |
| 2005/0187983 | A1 | 8/2005 | Narang et al. |
| 2007/0101069 | A1 | 5/2007 | Corbett et al. |
| 2009/0271418 | A1 | 10/2009 | Vaghani et al. |
| 2010/0333116 | A1 | 12/2010 | Prahlad et al. |
| 2012/0233228 | A1* | 9/2012 | Barton ................... H04L 67/06 707/827 |
| 2013/0031308 | A1 | 1/2013 | De Spiegeleer et al. |
| 2013/0305039 | A1* | 11/2013 | Gauda ................. G06F 21/6218 713/153 |
| 2015/0012495 | A1* | 1/2015 | Prahlad ............... G06F 16/1844 707/640 |
| 2015/0288755 | A1* | 10/2015 | Mosko .................. G06F 16/178 709/248 |
| 2016/0142752 | A1* | 5/2016 | Ohno ................. H04N 21/2402 725/116 |
| 2017/0123931 | A1* | 5/2017 | Aizman .............. G06F 11/1448 |
| 2017/0351581 | A1* | 12/2017 | Bakshan ............. G06F 11/1464 |

OTHER PUBLICATIONS

EMC Corporation, "Cloud Tiering Appliance," (Web Page), Policy-Based File Tiering; Archiving, and Migration, 2015, 2 pages, available at http://india.emc.com/data-protection/cloud-tiering-appliance.htm.

Hewlett-Packard Development Company, L.P., "HP Helion Public Cloud Object Storage API Specification," (Web Page), May 2014, 46 pages, available at http://docs.hpcloud.com/api/object-storage/#4.RESTAPISpecifications.

Kpfaulkner, "Optimising Azure Blob Updating (Part 1)," (Web Page), Random Tech Posts, Jan. 4, 2014, 7 pages, available at https://kpfaulkner.wordpress.com/2014/01/04/optimising-azure-blob-updating-part-1/.

L'Opez, P. G. et al., "Stacksync: Architecturing the Personal Cloud to Be in Sync," (Research Paper), May 31, 2013, 20 pages, available at http://stacksync.org/wp-content/uploads/2013/11/stacksync_full_paper.pdf.

Panzura, Inc., "Panzura Snapshot Technology," (Research Paper), 2013, 3 pages, available at http://panzura.com/wp-content/uploads/2013/01/Snapshot%20Technology%20Brief.pdf.

Rouse, M., NAS Filer (Network-attached Storage Filter), (Web Page), Jun. 30, 2015, 1 pages, available at http://searchstorage.techtarget.com/definition/NAS-filer-network-attached-storage-filer?vgnextfmt=print.

Taylor, M., "Cloud Archive: What It Is and What Types of Cloud Archive Services Exist," (Web Page), copyright 2000-2015, TechTarget, 6 pages, available at http://www.computerweekly.com/feature/Cloud-archive-What-it-is-and-what-types-of-cloud-archive-services-exist.

Amazon Web Services, "AWS Storage Gateway", available online at <https://web.archive.org/web/20120126091431/http://aws.amazon.com/storagegateway/>, Jan. 26, 2012, 5 pages.

Baltazar et al., "Your BT Agenda Demands A Hybrid Cloud Storage Strategy", Jan. 8, 2015, 12 pages.

Renny Shen, "Building a Cloud-enabled File Storage Infrastructure", 2011, 19 pages.

Search Report and Written Opinion received for PCT Application No. PCT/US2015/010238, dated Jun. 29, 2015, 9 pages.

* cited by examiner

TIERING DATA BLOCKS TO CLOUD STORAGE SYSTEMS

BACKGROUND

Cloud storage systems are widely used in setups having considerably large amounts of objects, such as files, directories, links and other file system objects, to be stored and accessed. The benefits of the cloud storage has resulted in the many variations of cloud integrated storage systems. Cloud storage techniques allow users to move their on premise data stored in local file systems to cloud storage systems seamlessly and efficiently, since it solves their scalability needs with minimal data management overheads. Data changes (re-writes) for data residing on cloud require the data to be brought to the local file system, realigned and moved to the cloud storage system again.

BRIEF DESCRIPTION OF THE DRAWINGS

The following detailed description references the drawings, wherein.

DETAILED DESCRIPTION

A computing device may store data in storage devices in a local file system integrated into the computing device itself. In turn, said local file system may store data in "file system objects", such as files, directories, etc., and may also store metadata associated with each file system object. In some examples, the local file systems may store data and metadata by using inodes. Inodes are data structures used to represent file system objects. Each inode generally stores the attributes and data block location(s) of the file system objects data. In such examples, data block location(s) of an inode may be said to "point" to data of a file system object associated with the inode. Filesystem object attributes may include metadata (e.g. change, access, modify time), as well as owner and permission data (e.g. group-ID, user-ID, permissions, etc.).

A snapshot is the state of a system, file, directory, or any other filesystem object, at a particular point in time. Modern storage file systems, more importantly Network Attached Storage (NAS) filers, provide facility to snapshot directory tree at periodic intervals with few of such implementations relying on using the Copy-On-Write (COW) technology. With the COW based implementation of snapshots, the changes between any two points in time snapshots can be tracked and precisely deciphered. As an example, a file with a size of 10 MB is created and, at instant t0 (epoch) a snapshot of the file is taken and the file is expanded by 1 MB. There will be two inodes in the chain to refer to both versions, the head inode pointing to the latest version of the file with 1 MB addition and the original pointing to the 10 MB file that was created originally. These inodes are linked together, so that the changed data blocks can be identified by traversing through the chain from latest to oldest. So, a version of the file is locally identified by the epoch at which the snapshot was created. With these implementations, change of the original file, previously broken down into data blocks, causes the local file system to share as many data blocks that are common, and only have the new blocks allocated for the re-written or newly expanded file portions. The modified data can be tracked by comparing the data block allocations across two given snapshots and the changes can be calculated quickly. With this approach the storage utilization is considerably reduced in local storage systems by storing shared data blocks only once which are common among many snapshots in the chain.

Computing devices may also store data in cloud storage systems, which may store data as "objects", and objects may be held together in containers. Said containers may store pseudo folders that in turn, store data as objects. Cloud storage systems are predominantly a flat structure. The container may be thought of as a directory in the cloud that holds objects, but, in general, there is no hierarchy in cloud and thus, containers cannot be nested. However some cloud implementations allow pseudo folders to be created within containers to simulate a hierarchy in cloud. Essentially, under each cloud storage account, a list of containers can be created and each of them can hold multiple objects and/or pseudo folders. Drawing parallel between the cloud storage system and the local file system, the data is stored as objects in the cloud storage systems as data is stored in files in the local file systems.

Some past solutions handle file reads that is tiered to cloud by reading the complete file rather than reading only the required data which makes the read operation inefficient. They also handle updates to tiered files inefficiently by recalling and uploading the complete file instead of that part of the file that is requested to be updated. This makes bandwidth utilization and performance worse and increases costs. Therefore, it may be desirable to provide a method to map local file system semantics to cloud storage system semantics such that, a similar structure to the COW based implementation of a snapshot structure on the local file system is created in the cloud storage system. The combination of breaking down data files into data chunks with a storing/mapping procedure in the cloud storage system that "emulates" the COW based implementation of snapshots in local file systems will allow managing file read and write operations in local file systems by retrieving only the required data chunks instead of the full file from the cloud storage system, updating (re-write) files previously tiered to the cloud storage system efficiently at different epochs by retrieving, modifying and re-tiering only the minimum number of required data chunks, and storing revisions/snapshots of data files in cloud by tiering to cloud only the modified chunks for each epoch (revision/snapshot) of the file. This solution provides a more efficient performance and cost savings in both storage and data transfer stages from local file systems to cloud storage systems.

Examples described herein may include a method to tiering data blocks from local file systems to cloud storage systems. Some examples comprise providing, by a cloud provider engine of a computing device, file system objects, for example files, directories, etc., from a local file system of the computing device to a cloud storage system, wherein the cloud storage system is to store the file system object as data chunks. Such examples further comprise managing write requests from users for data that resides on the cloud storage systems. In such examples, file contents of filesystem objects are broken down into a plurality of data chunks which are tiered and stored in corresponding pseudo folders in the cloud storage system. In turn, the local file system comprises, for each filesystem object, at least one inode. Each pseudo folder in a container in the cloud storage system corresponds to a version of the filesystem object at a particular epoch (revision or snapshot). The inodes in the local file system store metadata information that includes attributes, permissions, file modifications record, etc., of the filesystem object when said filesystem object has been completely tiered to the cloud storage system. Said inodes may comprise indications, such as pointers, to the portions of the file contents of the filesystem object when said portions of the file contents are stored as data blocks in the local file system. Said locally allocated data blocks store some file contents of the filesystem object and are yet to be tiered to the cloud storage system. Besides, each pseudo folder in the cloud storage system stores a manifest file including pointers to pseudo folders that store the data chunks that corresponds to the filesystem object at the particular epoch. In some examples, manifest file may map the chunk number to the pseudo folder where the actual data chunk is stored and a special value "THIS" may indicate the data chunk is in same pseudo folder. Once the file system object is tiered/moved completely to the cloud storage system, the file contents stored as data blocks in the local file system are removed by the local file system, so the local storage is freed.

As used herein, to "tier" means to move, upload, or transmit data, for example a file or data block, from a local file system to a cloud storage system using a cloud providing engine as described herein.

Examples described herein may comprise a policy engine that may generate and store, in a policy database, different tiering policies, and that may identify the filesystem object candidates that are ready to be tiered to the cloud storage system based on a particular tiering policy. The tiering policies may be time based policies (for example, tier files last read 10 days back), personality based policies (for example, tier all the *.jpg files) or a combination of both. Such examples may also include a cloud provider engine that is the actual data mover to the cloud storage system. On receiving a list of filesystem objects from the policy engine, said objects being ready to be tiered to the cloud storage system, the cloud provider engine moves the data stored in a local storage of the local file system to the cloud storage system as a set of data chunks maintaining a manifest in the cloud storage system for its future access. The identification of the filesystem object in the cloud storage system is abstracted and cloud provider engine leaves enough intelligence to map the filesystem object between local storage system and the cloud storage system. Such examples may further comprise a file system driver to interpret Virtual File System (VFS) calls received from users, said VFS calls being selected among read calls, write calls, append calls and delete calls. This file system driver may communicate the responses of the VFS calls such as read, write to the user.

As used herein, the policy engine may be any combination of hardware and programming (as described below) to implement the functionalities of the policy engine described herein. In some examples, the functionalities of the policy engine may be at least partially implemented in the form of electronic circuitry.

In such examples, the local file system may receive a request from a user to write or read to a filesystem object that is already tiered in the cloud storage system, the request comprising a data offset and a data size. The local file system identifies whether the data requested is completely tiered to cloud or it is partially tiered or it is completely available in the local storage. In case of the data is completely or partially tiered, the cloud provider engine locates the data portions of the filesystem object that are required to be written or read, by computing the data offset and data size received. When the required data portions are stored in the local storage of the local file system, the cloud provider engine does not need to retrieve any data chunk from the cloud storage system, but the request will be served by the local file system itself.

The request to write a filesystem object may include overwriting data existing in the filesystem object, aggregating or appending data to the filesystem object or deleting data from the filesystem object. For all the cases the local filesystem will allocate the data blocks for the data size of the write request and write the data locally. The corresponding inode may be updated by the local file system, with the location of the data blocks stored in the local file system. After that, the write request is completed and a response may be sent to the user or application that may have issued the request. The modified data contents stored in the local file system (data blocks) may be re-tiered, as data chunks, to the cloud storage system when a pre-established tiering policy determines that these data chunks are ready to be re-tiered to the cloud storage system.

The local file system may receive a request to read a filesystem object completely or partially tiered, wherein the filesystem object does not have snapshots. The local file system may get the request and finds out that the filesystem object, at least partially, exists in cloud. Since the object has no snapshots, the requested data chunks will be stored in the current pseudo folder and the cloud provider engine would fetch the data chunks corresponding to the read request directly from the current pseudo folder. In other examples, the request to read a filesystem object completely or partially tiered may be a read request to a filesystem object with snapshots for which the local file system may get the manifest file from the cloud storage system corresponding to that particular epoch and retrieve the corresponding data chunks from the corresponding pseudo folders according to the read request. In both cases, the read data may be stored in the local memory of the file storage system and a response may be sent back to the user or application that sent the request.

Figure 1:
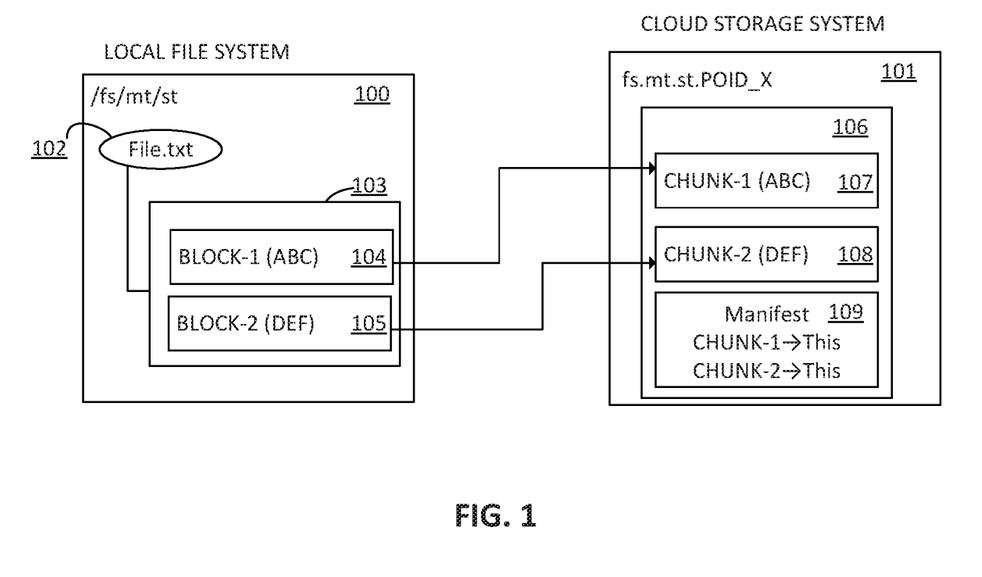
FIG. 1 is an example of a method of representing and mapping data blocks in the cloud storage system without a snapshot of a filesystem object, said data blocks being tiered to the cloud storage system.

Referring now to the drawings, FIG. 1 is an example of a method of representing and mapping data blocks in the cloud storage system without a snapshot of a filesystem object, said data blocks being tiered to the cloud storage system.

In such example and for simplicity reasons, each data block maps to a single data chunk, and thus, the data content of each data block is stored in a single data chunk in the cloud storage system. However, examples described herein may map a plurality of data blocks to a single data chunk. For example, in an implementation wherein the data chunk size is 64 KB may allow 8 data block (each data block with size 8 KB) mapping a single data chunk. Other examples may comprise 2, 4, 8, 16 or any other number of data blocks mapping to a single data chunk.

FIG. 1 describes the representing and mapping process of a file 102 that is stored in the local file system 100 and that is tiered to the cloud storage system 101. The file 102, named as "File.txt", comprising data "ABCDEF", is chunked into two data chunks, "Chunk-1 (ABC)" 107, storing data ABC, and "Chunk-2 (DEF)" 108, storing data DEF. The method maps a unique ID as a container identifier for the filesystem objects, including files, in the cloud storage system 101. As an example, if the unique ID for a file "File.txt" that exists in directory structure "/fs/mt/st" is POID_X then the container name will be "fs.mt.st.POID_X" to hold all the pseudo folders, and thus, all versions of the file 102 at different epochs, within. The local file system 100 stores an inode 103 corresponding to a pseudo folder 106 in the cloud 101, the inode 103 and the respective pseudo folder 106 being associated to the same version of the file 102 at the same epoch. The inode 103 further stores pointers to two data blocks "Block-1(ABC)" 104 and "Block-2 (DEF)" 105 that stores the data contents corresponding to the respective "Chunk-1(ABC)" 107 and "Chunk-2(DEF)" 108 until they are tiered to the cloud storage system. These "Block-1(ABC)" 104 and "Block-2(DEF)" 105 may be stored in a local storage that may be part of the computing device, such a disk partition. Once Block-1 104 and Block-2 105 are tiered to the cloud storage system as Chunk-1 (ABC)" 107 and "Chunk-2(DEF)" 108, by the cloud provider engine according to a policy engine and based on a pre-established tiering policy, and stored in the corresponding current pseudo folder, the local filesystem deletes the created "Block-1(ABC)" 104 and "Block-2(DEF)" 105 from the inode 103. The inode 103 stores metadata including attributes such as permissions, identifiers, etc. Thus, in order to extend the use of COW to cloud storage system, a pseudo folder 106 in cloud storage system 101 is created for each version (epoch) of the file. The mapping of Chunk-1(ABC) 107 and Chunk-2(DEF) 108 into different versions of the file 102 at different epochs is achieved by creating a manifest file 109 per version. Manifest file 109 maps the data chunks to the pseudo folders where the version of the file at the same epoch in which the manifest was created is stored. A special pointer with value 'THIS' indicates that the particular data chunk is in the same pseudo folder than the manifest file. For this particular example, the manifest file 109 stores pointers with value "THIS" for Chunk-1(ABC) 107 and Chunk-2 (DEF) 108. Therefore, the manifest file 109 is indicating that Chunk-1(ABC) 107 and Chunk-2(DEF) 108 are stored in the current pseudo folder 106.

Figure 2:
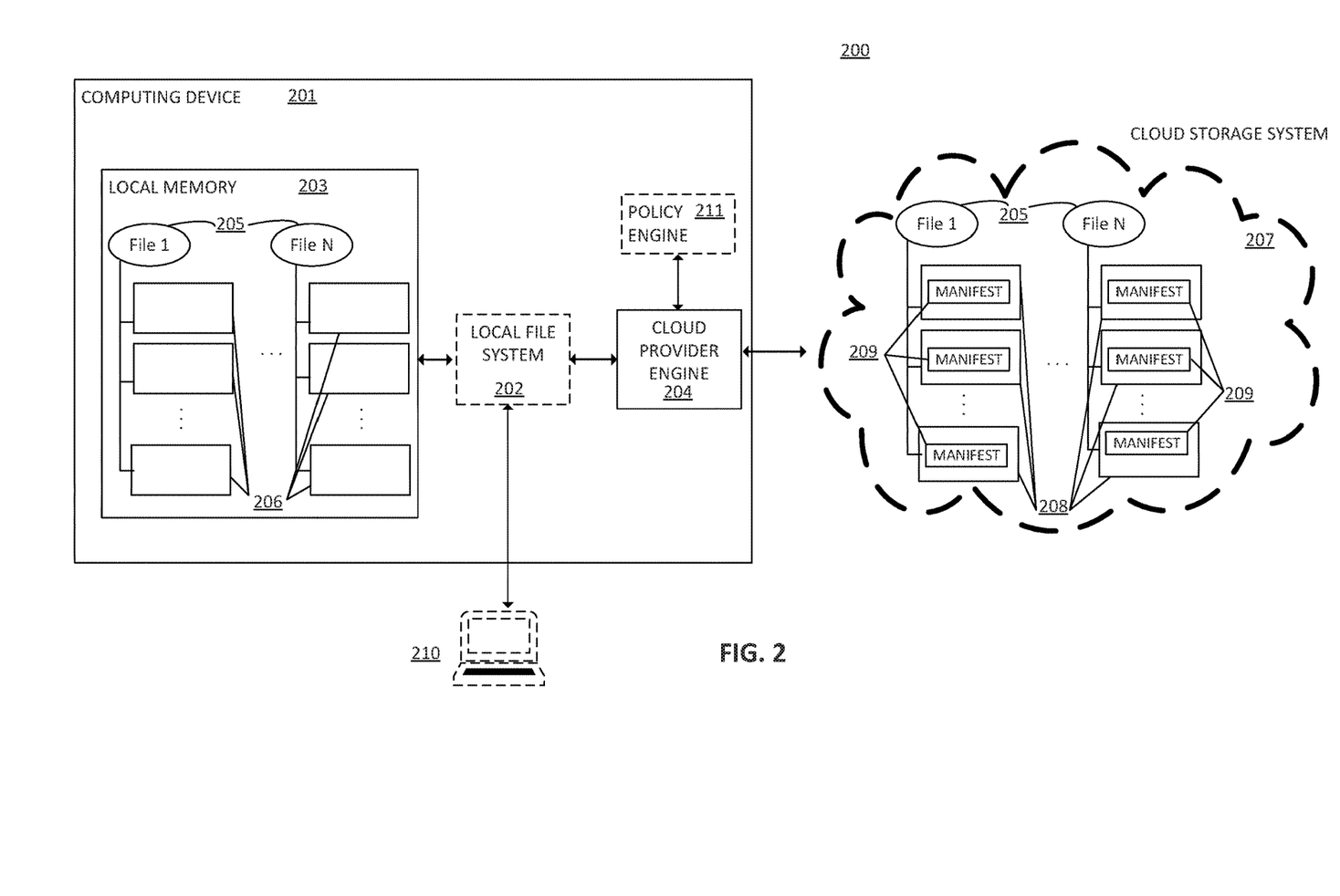
FIG. 2 is a block diagram of an example system of tiering data blocks to cloud storage systems.

FIG. 2 is a block diagram of an example system 200 to tier data blocks to cloud storage systems. The system 200 comprises a computing device 201 that in turn comprises a local file system 202, a cloud provider engine 204, a local memory 203 and a policy engine 211. The local file system 202 communicates the local memory 203 and with the cloud storage system 604 through the cloud provider engine 204. The local memory 203 stores linked inodes 206 for each one of the files 205. Each one of the inodes 206 corresponding to a single file 205 is associated to a particular epoch of the file 205. Said inodes 206 store metadata of the file 205, including attributes such as permissions, user-ID, group-ID, etc., at the epoch in which the inode 206 was created and may further store pointers to locations of data blocks storing data contents of the file 205 at that respective epoch. The data blocks are stored in a local storage (not shown in the figure) in the computing device 201 until the data contents are tiered for the first time or re-tiered as data chunks to the cloud storage system 207. The metadata and the pointers stored in the inodes 206 may be generated by a metadata engine (not shown in the figure) implemented in the local file system 202. The cloud storage system 207 comprises a plurality of pseudo folders 208 for each one of the files 205. To each inode 206 of each file 205 in the local file system 202 corresponds a pseudo folder 208 in the cloud storage system 207. Each pseudo folder 208, which corresponds to a version of the file 205 at a particular epoch, stores the modified data chunks forming the file 205 that were modified at that epoch and a manifest file 109 including pointers to the pseudo folders 208 of the same file 205 storing all the data chunks of the file 205 at said epoch.

In such example, the communication between the local file system 202 and the cloud storage system 207 is performed by the cloud provider engine 204 making use of specific network interface device(s) (not shown in the figure) installed in the local file system 202 and the cloud storage system 207 via at least one computer network. As described herein, a computer network may include, for example, a local area network (LAN), a virtual LAN (VLAN), a wireless local area network (WLAN), a virtual private network (VPN), the Internet, or the like, or a combination thereof. The cloud storage system 207 may comprise a Representational State Transfer (REST) Application Programming Interface (API) to store and retrieve objects and to create and delete the containers and the pseudo folders.

In such example, the cloud provider engine 204 is to divide the data blocks of a file into data chunks and to tier the data chunks to the cloud storage system 207. The files to be tiered to the cloud storage system are identified by a policy engine 211 according to a pre-established tiering policy that determines the conditions under which the data blocks stored in the local file system 202 are tiered to the cloud storage system 207. When the tiering policy is fulfilled, the cloud provider engine 204 cause the cloud storage system 207 to create a current pseudo folder 208 in the cloud storage system 207, said current pseudo folder 208 corresponding to the version of the file 205 at the epoch. Then, the cloud provider engine 204 tiers the data blocks (data contents) as data chunks to the created current pseudo folder 208 and creates a current manifest 209 storing pointers to the tiered data chunks. The created current manifest file 209 is also tiered to the created current pseudo folder 208. After that, the local file system 202 deletes the data blocks from the local storage and the pointers from the corresponding inode 206. In doing so, the local filesystem 202 leaves an inode stub 206 corresponding to each version of the file at each epoch to sufficiently satisfy the metadata queries and also to enforce the compliance needs. The pseudo folders 108 corresponding to the data chunks of the file 205 at different epochs are stored as individual objects and any increments over them (like delta) are stored as individual objects again with an ability to re-stitch them on demand.

The local file system 202 is to receive requests from users 210 to write a file 205 that at least partially resides in the cloud storage system, said requests comprising at least a data offset and a data size. For the case in which the file 205 has a snapshot, the local file system 202 is to allocate the data blocks to write the data in local storage. Then the local file system 202 is to duplicate an inode 206 at the previous version of the file 205, modify the data blocks pointers of the inode 206 to the newly created data blocks and update the file metadata accordingly. After that, the local file system 202 is to send a response back to the application or user that sent the write request. For the case in which the file 205 does not have snapshot, the local file system 202 is to allocate the data blocks to write the data in local storage, update the data blocks pointers of the inode 206 to the newly created data blocks and update the file metadata accordingly. After that, the local file system 202 is to send a response back to the application or user that sent the write request. While re-tiering, independently of the existence of a snapshot in the file 205 and in response to fulfillment of a pre-established tiering policy, the cloud provider engine 204 is to retrieve the current manifest file 209 from a current pseudo folder 208 and to compute the data chunk(s) details based on the retrieved current manifest file 209, the data offset and the data size, of the data chunks that need to be retrieved from the cloud storage system 207. The cloud provider engine 204 is to retrieve the computed data chunks from the corresponding pseudo folders 208 and to write over them based on the data offset and the data size. The updated data chunks will be tiered to cloud storage system 207 and also the updated manifest file 209 will be tiered to current pseudo folder 208.

As used herein, the cloud provider engine 204 may comprise any combination of hardware and programming to implement the functionalities of the cloud provider engine described herein. In examples described herein, such combinations of hardware and programming may be implemented in a number of different ways. For example, the programming for one or more engines may be processor executable instructions stored on at least one non-transitory machine-readable storage medium and the hardware for one or more engines may include at least one processor to execute those instructions. In some examples, the at least one machine-readable storage medium may store instructions that, when executed by the at least one processing resource, at least partially implement the one or more engine(s). In examples described herein, multiple engines may be collectively implemented by a combination of hardware and programming, as described above. In some examples, the functionalities of the cloud provider engine may be at least partially implemented in the form of electronic circuitry.

Figure 3:
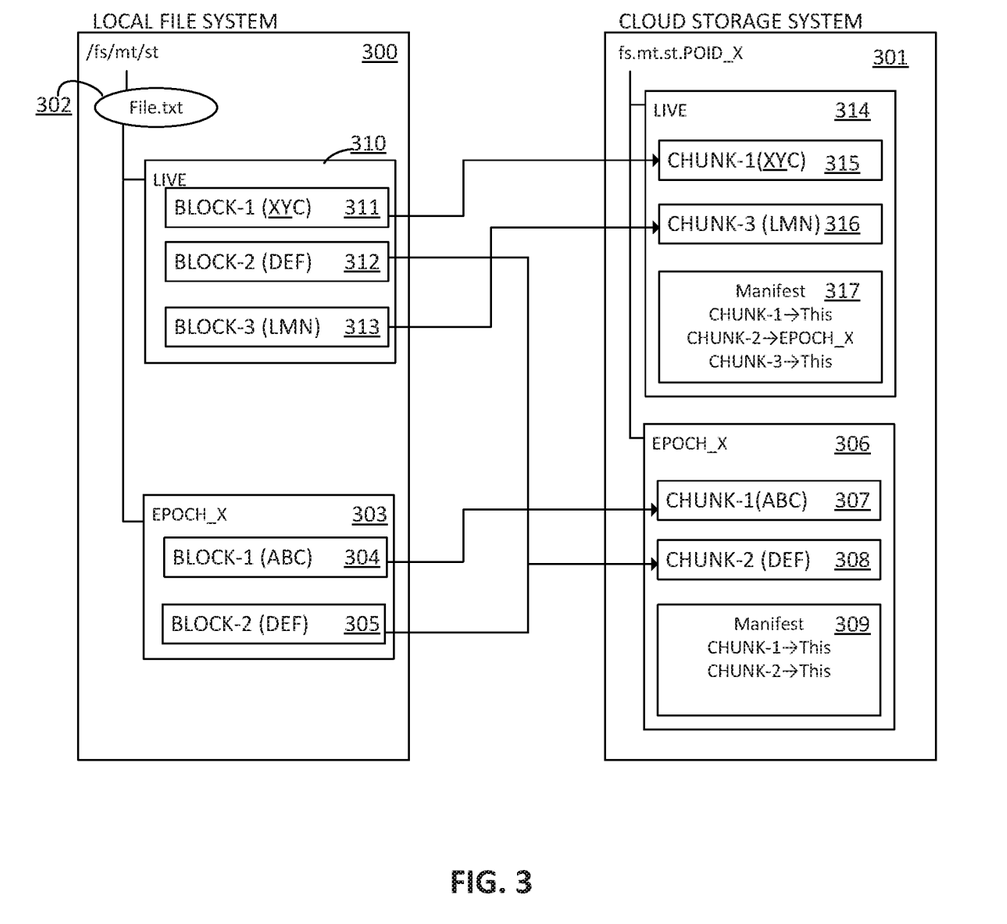
FIG. 3 is an example of a method of representing and mapping data blocks in the cloud storage system with a snapshot of the filesystem object, said data blocks being tiered to the cloud storage system.

FIG. 3 is an example of a method of representing and mapping data blocks in the cloud storage system with a snapshot of the filesystem object, said data blocks being tiered to the cloud storage system.

In this particular example, the local file system 300 receives a request to write the file "file.txt" 302. In particular, the request comprises partially overwriting Block-1 (ABC) 304, wherein ABC is changed to XYC, and adding a third data block "Block-3", storing data LMN, after a snapshot of the file 302 was taken at epoch (EPOCH_X). The local file system 300 also generates a current mode 310 named as "LIVE" mode that stores pointers to Block-1 (XYC) 311 and Block-3(LMN) 313 and metadata of the version of the file at the current epoch. Now if the pre-established tiering policy is satisfied for the "file.txt" 302, then the cloud storage system 301 has to first tier the data blocks corresponding to EPOCH_X pseudo folder 306 and then LIVE pseudo folder 314 of the file.txt 302. Hence, the cloud storage system 301 creates a current pseudo folder, named as "LIVE" pseudo folder and creates new data chunks CHUNK-1 307 and stores data ABC and CHUNK-2 308 with data DEF. The cloud storage system 301 also creates a current manifest file 309 and maps data CHUNK-1 307 and CHUNK-2 308 to "THIS" indicating that the particular data chunk is in the same pseudo folder 306. Then the cloud storage system 301 tiers the data corresponding to the LIVE pseudo folder 306. After that, the cloud storage system 301 creates a new current pseudo folder, named as "LIVE" pseudo folder 314, and renames the previous LIVE pseudo folder corresponding to the previous epoch as "EPOCH_X" pseudo folder 306. Then, the cloud provider engine creates a new Chunk-1(XYC) 315 to store XYC and then creates new Chunk-3 with data LMN 316. A new current manifest 317 is stored in LIVE pseudo folder 314 storing a pointer with value "THIS" for Chunk-1(XYC) 315 and Chunk-3(LMN) 316, as Chunk-1 315 and Chunk-3 are exclusive for LIVE pseudo folder 314, and a pointer with value "EPOCH_X" for Chunk-2(DEF) 308 as Chunk-2 is shared between EPOCH_X and LIVE. Once the file.txt 302 is tiered completely to cloud storage system, the local file system will delete the data blocks 311, 312, 313 from local storage and the LIVE mode 310 may store only metadata including attributes such as permissions, identifiers, etc.

Figure 4:
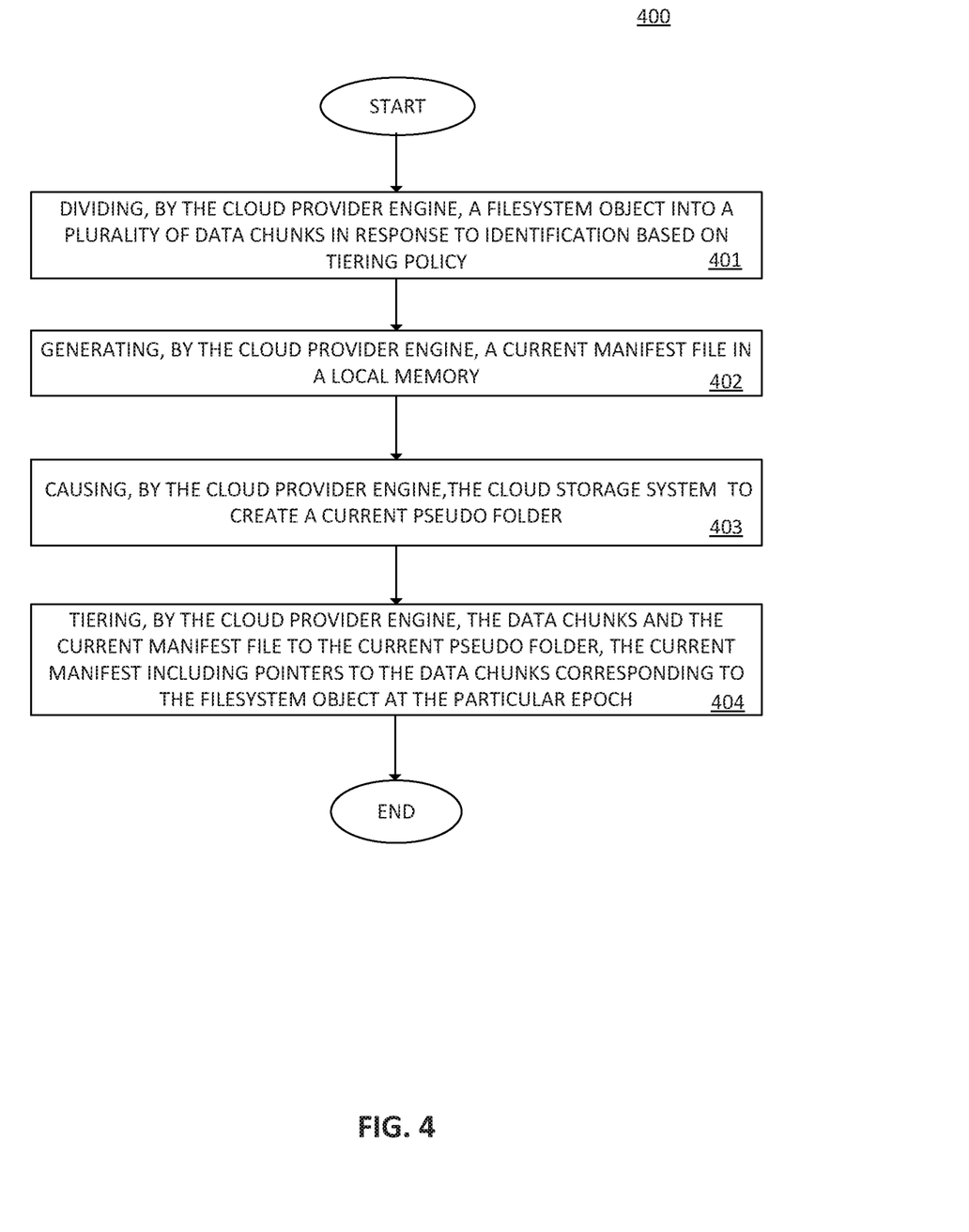
FIG. 4 is a flowchart of an example method of tiering data blocks to cloud storage systems, wherein the filesystem object does not exist in the cloud storage system.

FIG. 4 is a flowchart of an example method 400 of tiering data blocks to cloud storage systems, wherein the filesystem object does not previously exist in the cloud storage system. Although execution of method 400 is described below with reference to the system 200 of FIG. 2, other suitable systems for the execution of method 400 may be utilized. Additionally, implementation of method 400 is not limited to such examples.

When the policy engine identifies a file 105 not previously stored in the cloud storage system 207, as a candidate to be tiered to the cloud storage system 207 based on a particular tiering policy, the data contents of the file 205 are firstly divided 401, by the cloud provider engine 204, into a plurality of portions of data chunks. Then, these plurality of data portions of data chunks are read from the local file system, by the cloud provider engine 204, in to the local memory 203. After that, the cloud provider engine 204 generates 402 a current manifest file 209 in the local memory 203 and causes 403 the cloud storage system to create a current pseudo folder 208 corresponding to the version of the file 205 at the current epoch. Then, the data chunks are tiered 404 to the created current pseudo folder 208 and the current manifest file 209 storing pointers to the tiered data chunks is also tiered to the created current pseudo folder 208. After that, the local file system 202 deletes the data blocks from the local storage and the pointers from the corresponding mode 206.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 5 and 6.

Figure 5:
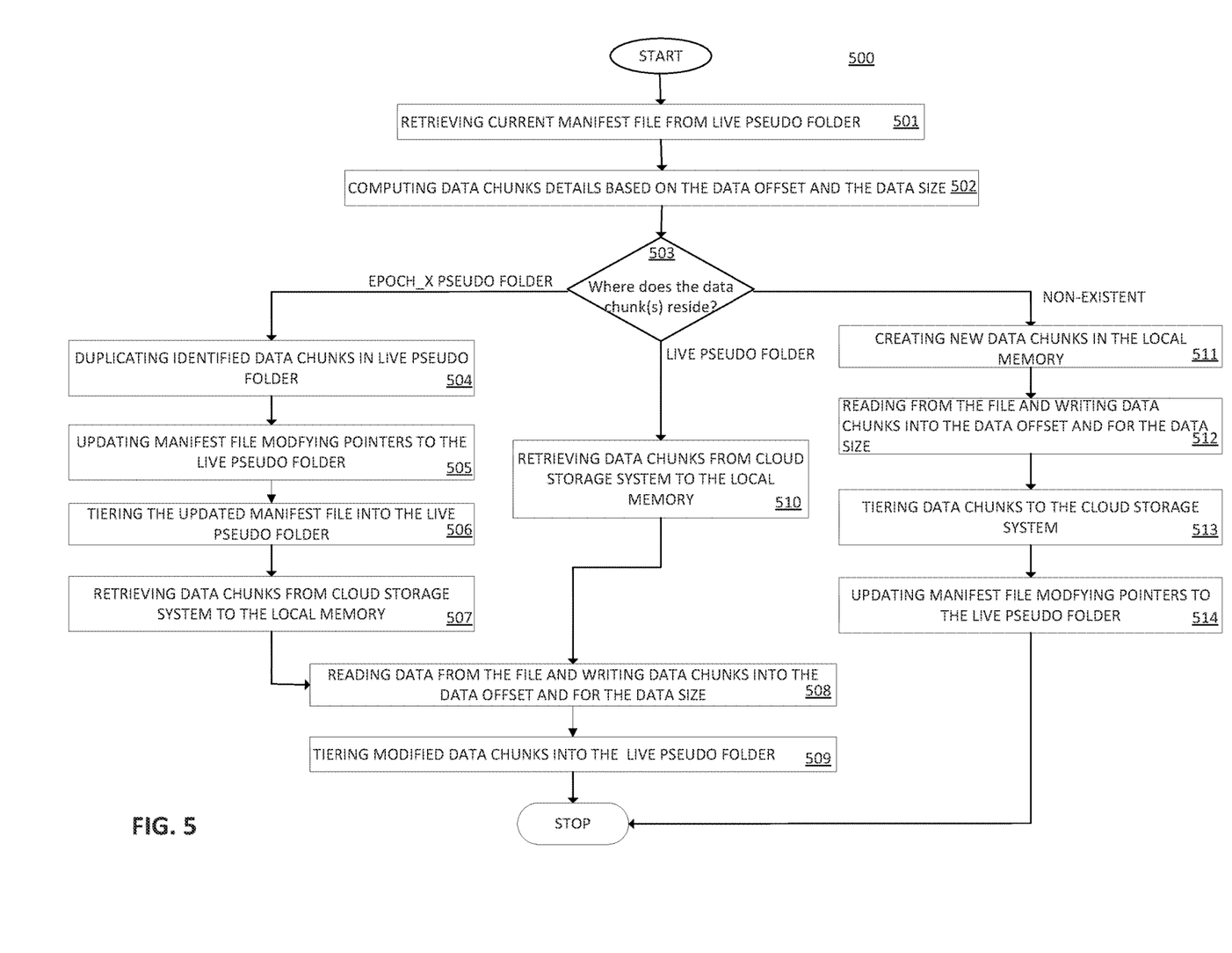
FIG. 5 is a flowchart of an example method of re-tiering data blocks to cloud storage systems, wherein data chunks are retrieved, modified and re-tiered to an already tiered filesystem object.

FIG. 5 is a flowchart of an example method 500 of re-tiering data blocks to cloud storage systems, wherein data chunks are retrieved, modified and re-tiered or appended to an already tiered filesystem object. Although execution of method 500 is described below with reference to the system 200 of FIG. 2, other suitable systems for the execution of method 500 may be utilized. Additionally, implementation of method 400 is not limited to such examples.

At 501 of method 500, the local file system 201 receives a request to write a file 205, said request comprising a data offset and a data size. The local file system 202 will allocate the data blocks to write the data in local storage and it will also duplicate an mode 206 at the previous version of the file 205 and modify the data blocks pointers to the newly created data blocks, update the file metadata accordingly and then response is sent back to the application which sent the write request.

According to the pre-established tiering policy when this modified data block becomes the candidate to re-tier the data to cloud storage system 207, the cloud storage engine 204 retrieves 501 the current manifest file 209 from the current pseudo folder 208, hereinafter referred to as LIVE pseudo folder, and computes 502 the data chunk(s) details based on the retrieved current manifest file 209, the data offset and the data size. If the cloud provider engine 204 determines 503 that the computed data chunks are stored in pseudo folders 208 ("EPOCH_X pseudo folder" corresponding to an epoch "X" previous to the current epoch) other than the existing LIVE pseudo folder 208 (case which modifies the shared data chunks), the cloud provider engine 204 causes the cloud storage system 207 to duplicate 504 the identified data chunks from the EPOCH_X pseudo folder into the LIVE pseudo folder 208. Then, the cloud provider engine 204 updates 505 the retrieved manifest file 209 by modifying the set of pointers to the duplicated data chunks. After that, the cloud provider engine 204 tiers 506 the updated manifest file 209 to the LIVE pseudo folder 208 and the created data chunks are retrieved 507 from the LIVE pseudo folder 208 to the local memory 203. Then the data is read 508 from the local file system 202, the local data offset is converted to chunk offset and then, the data is written to the appropriate chunk offset of the data chunks retrieved from the cloud storage system 207 and stored in local memory 203. After this, the data chunks are tiered 509, by the cloud provider engine 204, to the cloud storage system 207 at the LIVE pseudo folder 208. Then the local file system 202 may delete the data blocks from the local storage and may update the inode 206 accordingly to reflect the proper metadata.

While re-tiering, if the cloud provider engine 204 determines 503 that the computed data chunks are stored in the LIVE pseudo folder 208 (case which modifies the exclusive data chunks), the cloud provider engine 204 directly retrieves 510 the data chunks from cloud storage system 507 to local memory 203, Then the written data is read 508 from the file 205 in the local file system 202, the local data offset is converted to chunk offset and then, the data is written to the appropriate chunk offset of the data chunks stored in local memory 203. After this, the written data chunks are tiered 509 to the cloud storage system 207 at the LIVE pseudo folder 208. Then the local file system 202 may delete the data blocks from the local storage and updates the inode 106 accordingly to reflect the proper metadata.

While re-tiering, if the cloud provider engine 204 determines 503 that the computed data chunks do not exist in the cloud storage system 207 (case where new data blocks are added in the local filesystem), the cloud provider engine 204 creates a new data chunk(s) in the local memory 203. Then, the data is read 511 from the local file system 202, the local data offset is converted to chunk offset and then, the data is written to the appropriate chunk offset of the data chunk(s) created and stored in local memory 203. After this, the data chunk(s) are tiered 512 to the cloud storage system 207 at the LIVE pseudo folder. The cloud storage engine 204 retrieves 501 the current manifest file 209 from the current pseudo folder 208 to the local memory. After that, the current manifest file 209 is updated 514 by adding a pointer to the newly added data chunk(s) and tiered 506 to the LIVE pseudo folder 208. Then, the local file system 202 may delete the data blocks from the local storage and update the mode 106 accordingly to reflect the proper metadata.

In some other examples, if the request to write a file corresponds to a file that exists partially in local storage and in cloud, the writing request may be processed appropriately depending on a request range. If the writing request spans across both the data in local file system and in the cloud storage system, it may be processed by getting the data from the local file system and from the cloud storage system and consolidated data would be returned to the user.

In some other examples, the write request may include delete or truncate data contents of a filesystem object. The truncation may be for an entire filesystem object or up till the data offset included in the request. The local file system determines whether the data contents are stored in the local file system or in the cloud storage system. If the data contents are stored in data blocks in the local file system, then the request is handled locally by the local file system. When the data contents to be truncated are stored in data chunks in the cloud storage system and the filesystem object does not have snapshots (there is only a LIVE pseudo folder corresponding to a current version of the filesystem object) the cloud provider engine causes the cloud storage system to delete the corresponding data chunks from the LIVE pseudo folder and to update the current manifest file of the LIVE pseudo folder accordingly. When the data contents to be truncated are stored in data chunks in the cloud storage system, the filesystem object has snapshots (there is a LIVE pseudo folder and at least one EPOCH_X pseudo folder, corresponding to a version of the filesystem object at an epoch "X"), and the data chunks are exclusive (stored in the LIVE pseudo folder), the cloud provider engine causes the cloud storage system to delete the corresponding data chunks from the LIVE pseudo folder and to update the current manifest file of the LIVE pseudo folder accordingly. When the data contents to be truncated are stored in data chunks in the cloud storage system, the filesystem object has snapshots, and the data chunks are shared (stored in an EPOCH_X pseudo folder) the cloud provider engine causes the cloud storage system to delete the pointer pointing to the truncated data chunks from the current manifest file of the LIVE pseudo folder. If the data offset and data size of the truncate request doesn't fit exactly a complete data chunk(s), but overlaps the data chunks, the particular data chunks are duplicated in LIVE pseudo folder and the deletion happens only in the LIVE pseudo folder. Then the cloud provider will update the live manifest file accordingly to reflect the truncated data chunks in the live pseudo folder.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 4 and 6.

Figure 6:
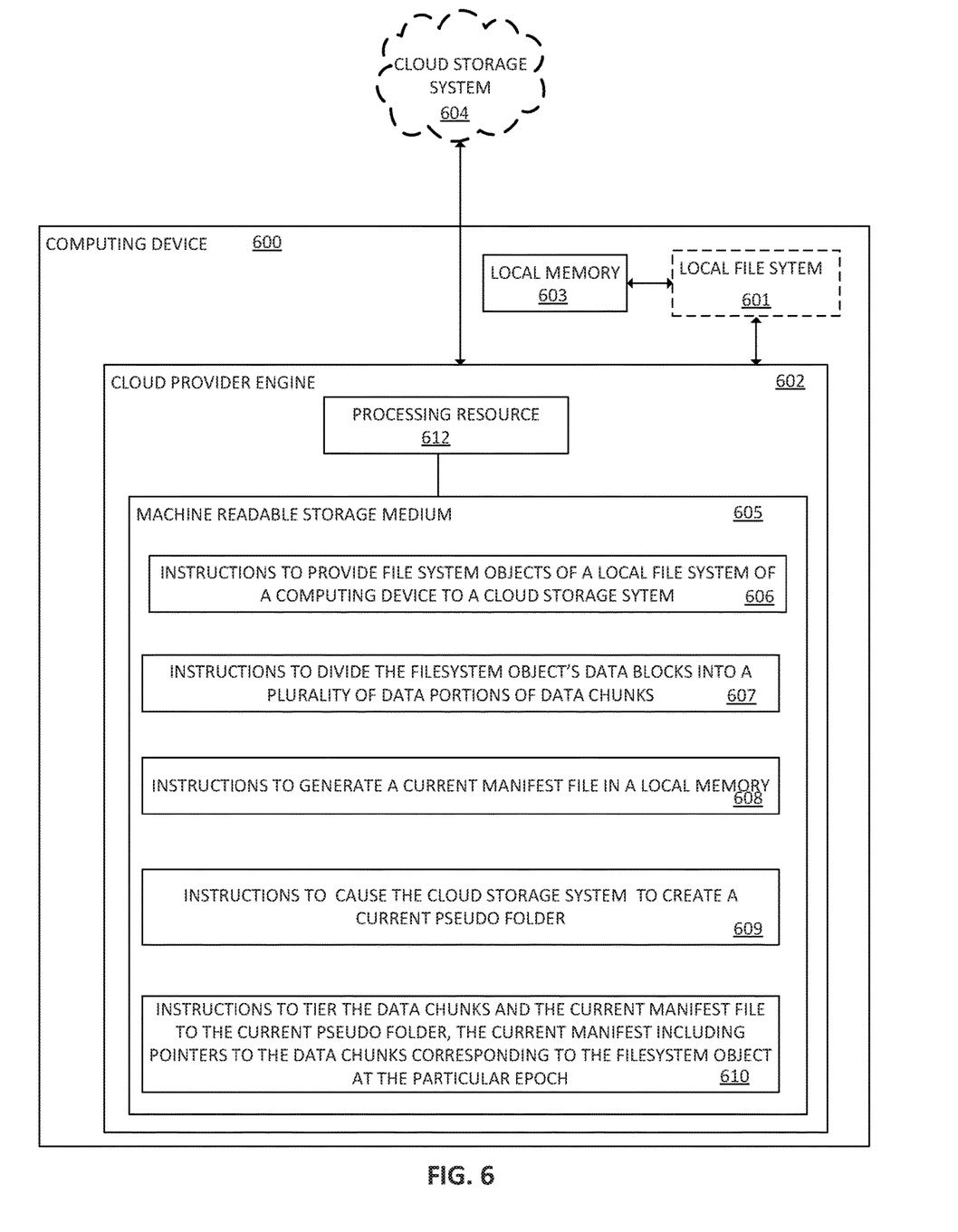
FIG. 6 is a block diagram of an example computing device to tier data blocks from local file systems to cloud storage systems.

FIG. 6 is a block diagram of an example computing device 600 to tier data blocks from local file systems 601 to cloud storage systems 604. Although the example computing device 600 is described with reference to components 601-605 and 612 other suitable computing devices to execute the instructions 606-610 may be utilized.

Computing device 600 comprises a local file system 601 that uses a local memory 603, such as a local cache, of computing device 600 and a cloud provider engine 602. The cloud provider engine 602 comprises a machine-readable storage medium 605 comprising (e.g., encoded with) instructions 606-610 executable by processing resource 612. Instructions 606-610 are executable by processing resource 612 of the cloud provider engine 602 to implement functionalities described herein in relation to FIGS. 1 to 5. In some examples, machine-readable storage medium 605 may include additional instructions. In other examples, the functionalities described herein in relation to instructions 606-610, and any additional instructions described herein in relation to the machine-readable storage medium 605, may be implemented at least in part in electronic circuitry or via engines comprising any combination of hardware and programming, as described above, to implement the functionalities of the engines, as described below). Computing device 600 may include network interface device(s) to communicate with other computing resource(s) (e.g., computing device(s)) via at least one computer network. As described herein, a computer network may include, for example, a local area network (LAN), a virtual LAN (VLAN), a wireless local area network (WLAN), a virtual private network (VPN), the Internet, or the like, or a combination thereof. The cloud provider engine 602 communicates with the local memory 603, with the cloud storage system 604 and with the machine-readable storage medium 605.

In the example of FIG. 6 the cloud provider engine 602 executes instructions to provide 606 the local file system 601 filesystem objects, such as files, to the cloud storage system 604, wherein the cloud storage system 604 is to store the filesystem objects as data chunks. When the policy engine identifies a filesystem object as a candidate to be tiered to the cloud storage system, said identification being based on a particular tiering policy, the cloud provider engine 602 executes further instructions to divide 607 the filesystem object into a plurality of data portions of data chunks; to generate 608 a current manifest file in the local file system 202 and to cause 609 the cloud storage system to create a current pseudo folder 208, the current manifest file 209 and the current pseudo folder 208 corresponding to the version of the file 205 at the current epoch. The cloud provider engine 602 executes further instructions to tier 610 the plurality of data portions of data chunks and the current manifest to the created current pseudo folder, the current manifest file storing pointers to the data chunks corresponding to the filesystem object at the particular epoch.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

As used herein, a "computing device" may be a desktop computer, laptop (or notebook) computer, workstation, tablet computer, mobile phone, smart device, switch, router, server, blade enclosure, or any other processing device or equipment including a processing resource. In examples described herein, a processing resource may include, for example, one processor or multiple processors included in a single computing device or distributed across multiple computing devices.

In some examples, instructions 606-610, may be part of an installation package that, when installed, may be executed by cloud provider engine 602 to implement the functionalities described above. In such examples, machine-readable storage medium 605 may be a portable medium, such as a CD, DVD, or flash drive, or a memory maintained by a server from which the installation package can be downloaded and installed. In other examples, instructions 606-610 may be part of an application, applications, or component(s) already installed on computing device 600 including cloud provider engine 602. In such examples, the machine-readable storage medium 606 may include memory such as a hard drive, solid state drive, or the like.

Although the flowchart of FIGS. 4-5 shows a specific order of performance of certain functionalities, methods 400, 500 are not limited to that order. For example, the functionalities shown in succession in the flowchart may be performed in a different order, may be executed concurrently or with partial concurrence, or a combination thereof. In some examples, functionalities described herein in relation to FIG. 2 may be provided in combination with functionalities described herein in relation to any of FIGS. 1, and 3-5.

All of the features disclosed in this specification (including any accompanying claims, abstract and drawings), and/or all of the elements of any method or process so disclosed, may be combined in any combination, except combinations where at least some of such features and/or elements are mutually exclusive.

Examples herein described present many advantages: it allows chunking the file data at optimal size and storing the data chunks as independent objects in cloud; enables handling partial file reads by retrieving a limited number of chunks instead of the full file, enables handling updates to tiered files efficiently by recalling and uploading only the modified chunks and to store revisions/snapshots in cloud by limiting uploading data chunks to the modified data chunks for each revision, thereby providing better performance and cost savings in both storage and data transfer to cloud; allows to move the file with snapshots to cloud in an efficient manner with less cost, to handle re-write/append operations to the file already in cloud in an efficient manner and to handle reading operations to the tiered files in an efficient manner.

Implementation of this disclosure will restrict data transfers to specific chunks of data that have changed thereby achieving efficient utilization of storage space in the cloud storage systems. The proposed solution extend the COW based snapshots implemented by modern file storage systems, and have a way to calculate only the incremental and push to cloud storage systems.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed:

1. A method comprising:
   in response to identification of a filesystem object as a candidate to be tiered to a cloud storage system based on a tiering policy, dividing, by a cloud provider engine of a computing device, data blocks of the filesystem object into data chunks;
   generating, by the cloud provider engine, a current manifest file in a local memory of the computing device;
   causing, by the cloud provider engine, the cloud storage system to generate a current pseudo folder in the cloud storage system corresponding to a particular epoch of the filesystem object;
   tiering, by the cloud provider engine, the data chunks and the current manifest file to the current pseudo folder, the current manifest including pointers to the data chunks corresponding to the filesystem object at the particular epoch;

re-tiering particular data chunks of the filesystem object;

retrieving the current manifest file from the current pseudo folder to the local memory;

updating the current manifest file in the local memory by including pointers to the particular data chunks; and tiering the updated manifest file to the current pseudo folder.

2. The method of claim 1, comprising:

receiving a request in the local file system, wherein the request comprises a request to read a filesystem object or a request to write a filesystem object, the request comprising a data offset and a data size.

3. The method of claim 2, wherein the request to write a filesystem object comprises one of a request to overwrite data from a filesystem object, a request to append new data to a filesystem object, and a request to truncate data from a filesystem object.

4. The method of claim 3, wherein when the local file system receives a request to truncate data from a filesystem object and the local file system determines that the particular data chunks of the filesystem object reside in the current pseudo folder, the cloud provider engine causes the cloud storage system to delete the particular data chunks from the current pseudo folder and to update the current manifest file by deleting pointers to the particular data chunks.

5. The method of claim 3, wherein when the local file system receives a request to truncate data from a filesystem object and the local file system determines that the particular data chunks of the filesystem object reside in a pseudo folder other than the current pseudo folder, the cloud provider engine causes the cloud storage system to delete pointers pointing to the particular data chunks from the current manifest file of the current pseudo folder.

6. The method of claim 2, wherein the method further comprises, when the local file system receives a request to read a filesystem object previously tiered to the cloud storage system:

retrieving, by the cloud provider engine, the current manifest file from the current pseudo folder;

computing data chunk details from particular data chunks, based on the data size and the data offset, to determine the pseudo folders in which the particular data chunks reside; and reading from the particular data chunks.

7. The method of claim 2, wherein the method further comprises:

when the local file system receives a request to write a filesystem object previously tiered to the cloud storage system, the local file system allocating data blocks in a local storage and writing the data blocks based on the data size of the request to write.

8. The method of claim 2, comprising re-tiering particular data chunks of the filesystem object residing in the current pseudo folder by the cloud provider, including:

retrieving the particular data chunks from the current pseudo folder to the local memory;

overwriting the particular data chunks based on the data offset and the data size of the request to overwrite data; and re-tiering the particular data chunks to the current pseudo folder.

9. The method of claim 1, the particular data chunks of the filesystem object residing in a pseudo folder other than the current pseudo folder, the method further comprising:

causing the cloud storage system to duplicate the particular data chunks in the current pseudo folder;

retrieving the duplicated data chunks from the current pseudo folder to the local memory;

overwriting the duplicated data chunks based on the data offset and the data size of the request to overwrite data; and re-tiering the duplicated data chunks to the current pseudo folder.

10. The method of claim 1, the particular data chunks of the filesystem object not existing in the cloud storage system, the method further comprising:

creating a new data chunk in the local memory;

writing the new data chunk based on the received data size of the request to append new data; and tiering the new data chunk to the current pseudo folder.

11. The method of claim 1, wherein the local file system generates inodes in the local file system, each inode corresponding to a particular epoch of the filesystem object and storing metadata of the filesystem object at the particular epoch.

12. The method of claim 1, comprising removing, by the local file system, the data portions of data blocks from a local storage of the local file system, when the data portions of the data chunks have been tiered to the cloud storage system.

13. A computing device comprising:

a hardware processor; and a non-transitory machine-readable storage medium encoded with instructions executable by the hardware processor to:

provide data blocks of filesystem objects as data chunks to pseudo folders in a cloud storage system, wherein each pseudo folder is to store a manifest file including pointers to pseudo folders to store the data chunks of the filesystem object at a particular epoch;

in response to identification of a given filesystem object as a candidate to be tiered to the cloud storage system based on a tiering policy, divide data blocks of the given filesystem object into data chunks;

generate a current manifest file in a local memory of the computing device;

cause the cloud storage system to generate a current pseudo folder in the cloud storage system, wherein the current manifest file and the current pseudo folder correspond to a particular epoch of the given filesystem object;

tier the data chunks and the current manifest file to the current pseudo folder, the current manifest including pointers to the data chunks corresponding to the given filesystem object at the particular epoch;

re-tier particular data chunks of the filesystem object;

retrieve the current manifest file from the current pseudo folder to the local memory;

update the current manifest file in the local memory by including pointers to the particular data chunks; and tier the updated manifest file to the current pseudo folder.

14. The computing device of claim 13, the non-transitory machine-readable storage medium encoded with instructions executable by the hardware processor to comprising identify filesystem objects suitable to be tiered to the cloud storage system based on the tiering policy.

15. The computing device of claim 13, the particular data chunks of the filesystem object residing in the current pseudo folder by the cloud provider, the non-transitory machine-readable storage medium encoded with instructions executable by the hardware processor to:

retrieve the particular data chunks from the current pseudo folder to the local memory;
overwrite the particular data chunks based on the data offset and the data size of the request to overwrite data; and
re-tier the particular data chunks to the current pseudo folder.

16. The computing device of claim 13, the particular data chunks of the filesystem object residing in a pseudo folder other than the current pseudo folder, the non-transitory machine-readable storage medium encoded with instructions executable by the hardware processor to:
cause the cloud storage system to duplicate the particular data chunks in the current pseudo folder;
retrieve the duplicated data chunks from the current pseudo folder to the local memory;
overwrite the duplicated data chunks based on the data offset and the data size of the request to overwrite data; and
re-tier the duplicated data chunks to the current pseudo folder.

17. The computing device of claim 13, the particular data chunks of the filesystem object not existing in the cloud storage system, the non-transitory machine-readable storage medium encoded with instructions executable by the hardware processor to:
create a new data chunk in the local memory;
write the new data chunk based on the received data size of the request to append new data; and
tier the new data chunk to the current pseudo folder.

18. An article comprising at least one non-transitory machine-readable storage medium comprising instructions executable by a cloud provider engine of a computing device to:
provide file system objects of a local file system of the computing device to a cloud storage system, wherein the cloud storage system comprises pseudo folders that store the data chunks, and wherein each pseudo folder stores a manifest file including pointers to pseudo folders that store the data chunks of the file system object at a particular epoch; and
in response to an identification of a filesystem object as a candidate to be tiered to the cloud storage system based on a tiering policy:

divide data blocks of the filesystem object into data chunks;
generate a current manifest file in a local memory of the computing device;
cause the cloud storage system to generate a current pseudo folder in the cloud storage system, the current manifest file and the current pseudo folder corresponding to a particular epoch of the filesystem object;
tier the data chunks and the current manifest file to the current pseudo folder, the current manifest including pointers to the data chunks corresponding to the filesystem object at the particular epoch;
re-tier particular data chunks of the filesystem object;
retrieve the current manifest file from the current pseudo folder to the local memory;
update the current manifest file in the local memory by including pointers to the particular data chunks; and
tier the updated manifest file to the current pseudo folder.

19. The article of claim 18, the particular data chunks of the filesystem object residing in a pseudo folder other than the current pseudo folder, wherein the instructions executable by the cloud provider engine of the computing device are further to:
cause the cloud storage system to duplicate the particular data chunks in the current pseudo folder;
retrieve the duplicated data chunks from the current pseudo folder to the local memory;
overwrite the duplicated data chunks based on the data offset and the data size of the request to overwrite data; and
re-tier the duplicated data chunks to the current pseudo folder.

20. The article of claim 18, the particular data chunks of the filesystem object not existing in the cloud storage system, wherein the instructions executable by the cloud provider engine of the computing device are further to:
create a new data chunk in the local memory;
write the new data chunk based on the received data size of the request to append new data; and
tier the new data chunk to the current pseudo folder.

* * * * *